United States Patent
Miyamoto (10) Patent No.: US 10,288,942 B2
(45) Date of Patent: May 14, 2019

(54) LIQUID CRYSTAL DISPLAY DEVICE

(71) Applicant: Japan Display Inc., Tokyo (JP)

(72) Inventor: Motoharu Miyamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/662,350

(22) Filed: Jul. 28, 2017

(65) Prior Publication Data
US 2018/0045993 A1 Feb. 15, 2018

(30) Foreign Application Priority Data

Aug. 10, 2016 (JP) ................. 2016-157393

(51) Int. Cl.
*G02F 1/1362* (2006.01)
*G02F 1/1337* (2006.01)
*G02F 1/1343* (2006.01)
*G02F 1/1368* (2006.01)

(52) U.S. Cl.
CPC .......... *G02F 1/1337* (2013.01); *G02F 1/1368* (2013.01); *G02F 1/13439* (2013.01); *G02F 1/134363* (2013.01); *G02F 1/136213* (2013.01); *G02F 1/136227* (2013.01); *G02F 1/136286* (2013.01); *G02F 2001/134372* (2013.01); *G02F 2201/121* (2013.01); *G02F 2201/123* (2013.01)

(58) Field of Classification Search
CPC ............... G02F 1/136227; G02F 2001/134372
See application file for complete search history.

(56) References Cited

U.S. PATENT DOCUMENTS

| | | | |
|---|---|---|---|
| 2007/0279564 A1 | 12/2007 | Iwato et al. | |
| 2012/0314169 A1* | 12/2012 | Naoe | G02F 1/133345 349/138 |
| 2015/0205161 A1* | 7/2015 | Okita | G02F 1/133512 349/106 |

FOREIGN PATENT DOCUMENTS

JP 2007-322563 A 12/2007

* cited by examiner

*Primary Examiner* — Kendrick Hsu
(74) *Attorney, Agent, or Firm* — Typha IP LLC (57) ABSTRACT

The invention prevents the display unevenness of a high-resolution liquid crystal display device that results from the presence of regions where an alignment film is not applied. The invention provides a liquid crystal display device including: a TFT substrate having scan lines, video signal lines, and pixels formed by the intersecting scan lines and video signal lines; a counter substrate; and a liquid crystal layer placed between the TFT substrate and the counter substrate. Each of the pixels includes a TFT, a pixel electrode, a common electrode, and a through-hole and an opening that are used to connect the TFT and the pixel electrode. Connective ITO is formed in and around the through-hole at the same time as the common electrode is formed. A step d is formed at an edge portion of the connective ITO and covered with an alignment film.

9 Claims, 11 Drawing Sheets

FIG. 12

LIQUID CRYSTAL DISPLAY DEVICE

CLAIM OF PRIORITY

The present application claims priority from Japanese Patent Application JP 2016-157393 filed on Aug. 10, 2016, the content of which is hereby incorporated by reference into this application.

BACKGROUND OF THE INVENTION

1. Field of the Invention

The present invention relates to display devices and particularly to a high-resolution liquid crystal display device that prevents display unevenness that results from the presence of regions where an alignment film is not formed.

2. Description of the Related Art

A typical liquid crystal display device includes a thin film transistor (TFT) substrate, a counter substrate facing the TFT substrate, and a liquid crystal layer placed between them. On the TFT substrate, pixels each having a pixel electrode, a TFT, and the like are formed in the form of a matrix. Images are produced by controlling the transmittance of light passing through the liquid crystal molecules on a pixel-by-pixel basis.

On the TFT substrate, the TFTs, the pixel electrodes, a common electrode and the like are formed in different layers, and necessary connections are established via through-holes. In the case of a high-resolution screen, the diameters of through-holes are smaller. According to JP-A-2007-322563, materials used in photolithography such as a resist and an alignment film material, which is in the form of liquid before being cured, are less likely to enter a through-hole as the diameter of its opening gets smaller.

To avoid this, JP-A-2007-322563 discloses a structure that facilitates the entry of a resist or alignment film material into a through-hole. This structure is obtained by forming, in a radial direction, projecting and recessed portions at the opening of the through-hole that is located farther from the substrate.

SUMMARY OF THE INVENTION

The screen resolution of liquid crystal display devices, especially small ones, is being enhanced. Enhancing resolution requires the area of each pixel to be reduced. This means that within a pixel, the area of the through-hole used to connect the pixel electrode to the source electrode of the TFT occupies a larger portion of that pixel. Moreover, the distance between the through-hole in the pixel and the through-hole in an adjacent pixel is reduced as well.

In liquid crystal display devices, an alignment film is formed to perform initial alignment on the liquid crystal molecules. The material of the alignment film is in the form of liquid at the time of application and baked after the application to form the alignment film. Unlike JP-A-2007-322563, we have discovered that as a through-hole gets larger, the alignment film is less likely to be formed in the through-hole. The areas where the alignment film is not formed will cause light leakage.

Typically, each through-hole is masked by a black matrix or the like. Thus, even if the alignment film is not formed in each through-hole, this does not pose a serious problem in terms of the alignment of the liquid crystals. However, if multiple regions where the alignment film is not formed are connected to one another, the whole area where the alignment film is not formed becomes larger, resulting in display unevenness. In the case of a high-resolution liquid crystal display device, such regions where the alignment film is not formed are more likely to occur, for the pixel pitch is small.

Figure 4:
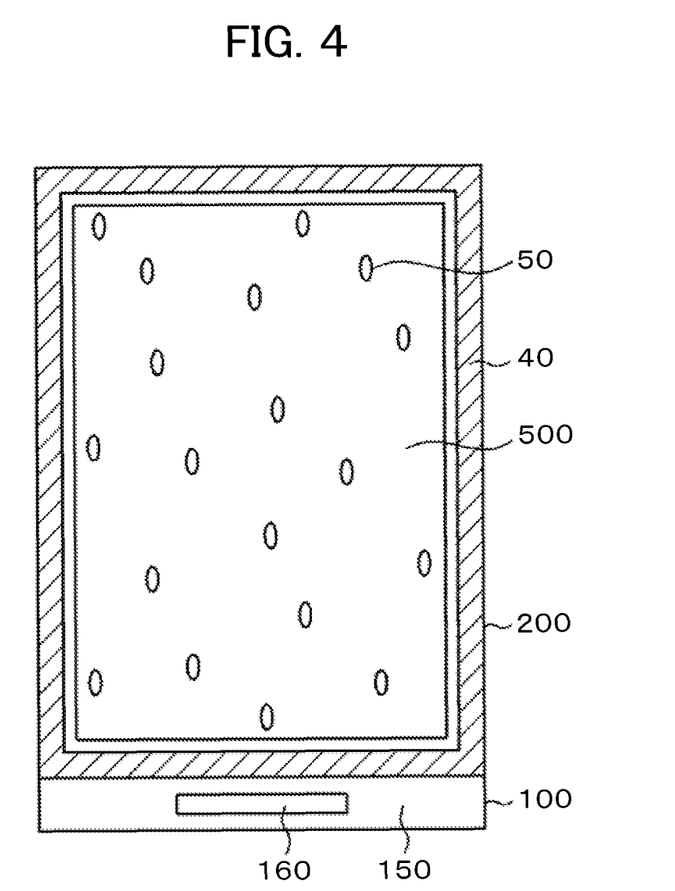
FIG. 4 illustrates an example of display unevenness resulting from the presence of regions where an alignment film is not formed.

FIG. 4 illustrates an example of such display unevenness. As illustrated, a display area 500 shows signs of display unevenness 50 in an isolated manner. Regions where the alignment film is not formed are present in multiple pixels, and those regions are connected to one another, causing display unevenness that can be easily seen.

To prevent such display unevenness, it is effective to reduce the diameters of through-holes. However, the through-holes are formed in an organic passivation film, which serves also as a planarizing film. Thus, the diameters of the through-holes cannot be reduced limitlessly. The alignment film is applied by flexography printing, inkjet printing, or the like, and by creating the proper application conditions, application unevenness or display unevenness can be prevented to some extent. However, creating such conditions will in turn increase the process load.

An object of the present invention is thus to achieve a structure that facilitates formation of the alignment film in through-holes and thereby prevent display unevenness.

The invention is designed to achieve the above object and can be implemented as the following means.

(1) A liquid crystal display device includes: a first substrate having a plurality of scan lines, a plurality of video signal lines, and pixels formed in the areas surrounded by the plurality of scan lines and the plurality of video signal lines; a second substrate; and a liquid crystal layer sandwiched between the first substrate and the second substrate. In the liquid crystal display device, each of the pixels includes a switching element, a pixel electrode, a common electrode, and a through-hole formed in an insulating film located between the switching element and the pixel electrode; a connection conductive layer is formed on an inner wall portion of the through-hole and in a through-hole surrounding area of the insulating film so as to electrically connect the pixel electrode and the switching element; and a step is formed at an edge portion of the connection conductive layer in the through-hole surrounding area of the insulating film, the step being covered with an alignment film.

(2) The liquid crystal display device recited in (1), in which the connection conductive layer is formed of indium tin oxide (ITO).

(3) The liquid crystal display device recited in (1), in which the connection conductive layer is formed of metal layer.

(4) The liquid crystal display device recited in (1), in which the connection conductive layer has a thickness of 100 nm or more.

DETAILED DESCRIPTION OF THE PREFERRED EMBODIMENTS

Embodiments of the present invention will now be described in detail.

Embodiment 1

Figure 1:
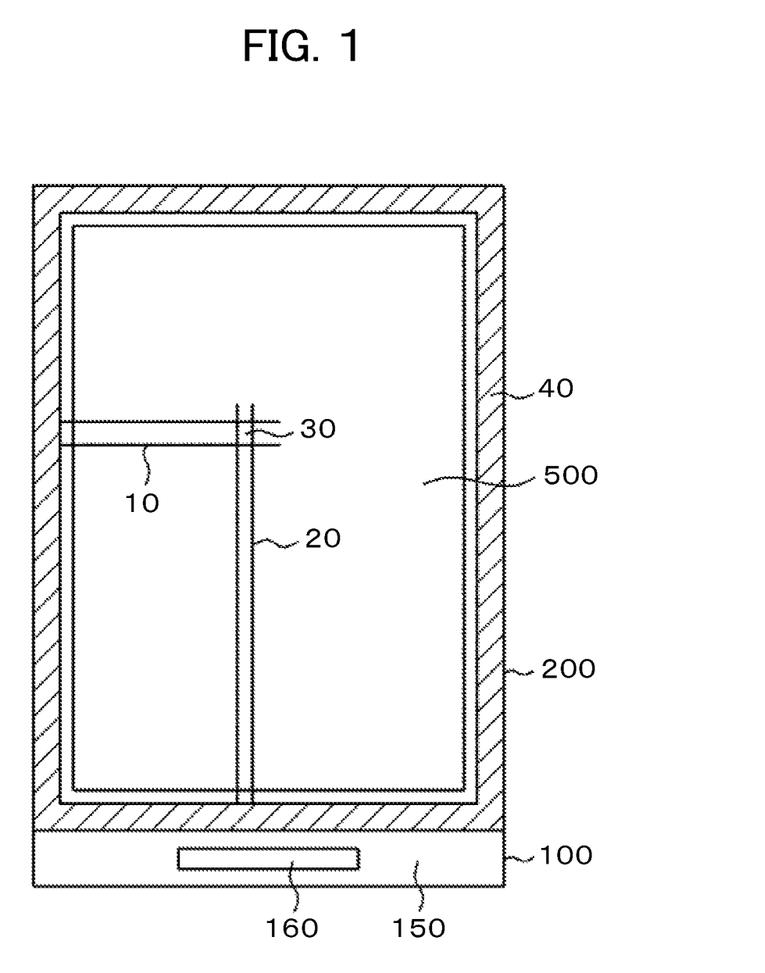
FIG. 1 is a plan view of a liquid crystal display device according to the invention.

FIG. 1 is a plan view of a liquid crystal display device to which the invention is applied. In FIG. 1, a TFT substrate 100 and a counter substrate 200 are glued by a sealing material 40, and a liquid crystal layer is sandwiched between the TFT substrate 100 and the counter substrate 200. The TFT substrate 100 is formed larger than the counter substrate 200, and the portion of the TFT substrate 100 that does not overlap any other layer serves as a terminal section 150. Formed at the terminal section 150 are an IC driver 160 for driving a liquid crystal display panel and terminals to which to connect a flexible printed circuit board for supplying to the liquid crystal display panel electric power, video signals, scan signals, and so on.

As illustrated in FIG. 1, within a display area 500, scan lines 10 extend in a first direction and are arranged in a second direction. Also, video signal lines 20 extend in the second direction and are arranged in the first direction. The areas surrounded by two scan lines 10 and two video signal lines 20 each constitute a pixel 30. In the case of a high-resolution liquid crystal display device, the area of the pixel 30 is considerably small, with its sides parallel to the extending direction of the video signal lines 20 being 78 µm or less, and its sides parallel to the extending direction of the scan lines 10 being 26 µm or less. Due to the presence of color filters, the pixel 30 serves as a red, green, or blue subpixel. Although a set of red, green, and blue subpixels is often referred to as a pixel, we hereinafter refer to each of red, green, and blue subpixels simply as "a pixel 30" unless otherwise specified.

Figure 2:
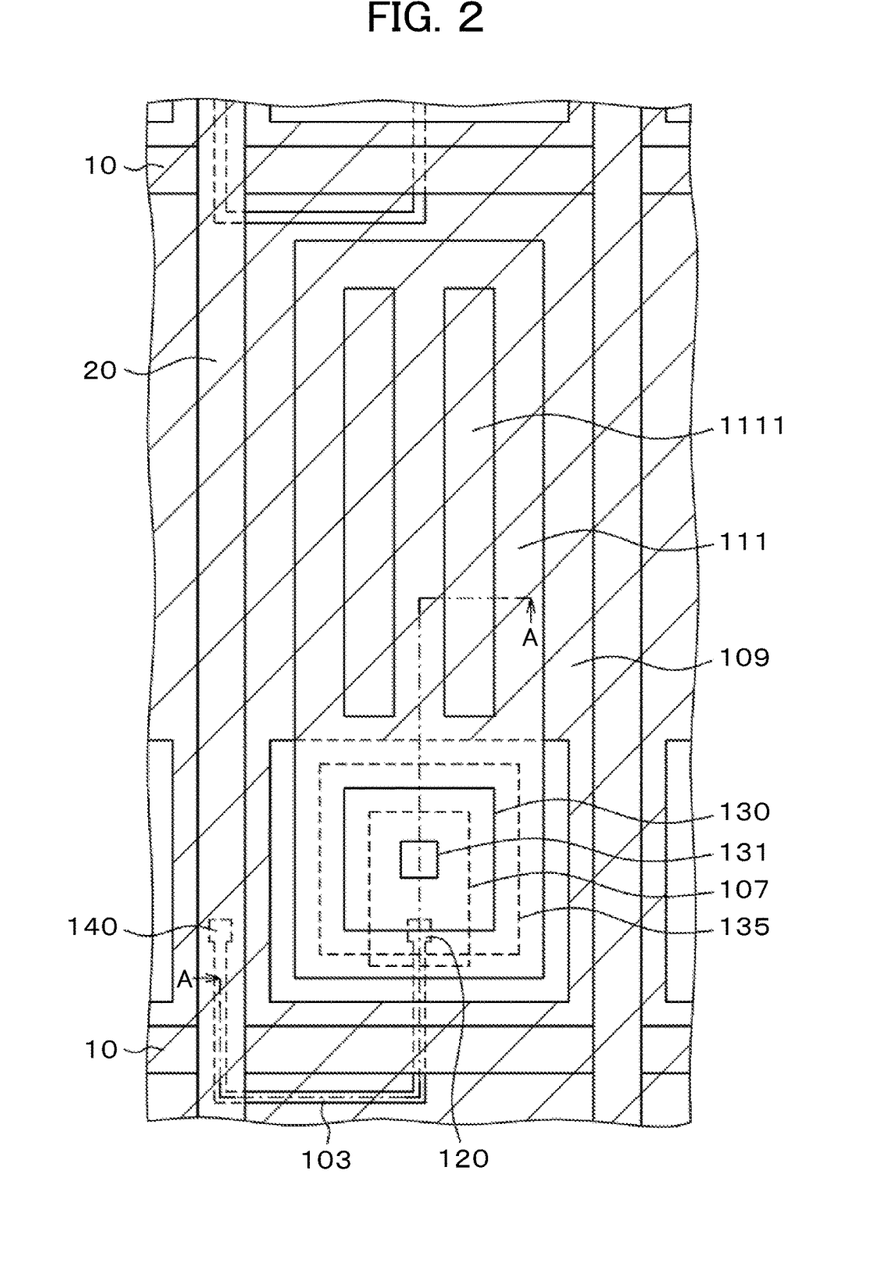
FIG. 2 is a plan view illustrating the structure of a pixel.

FIG. 2 is a plan view of a pixel 30 on the TFT substrate 100. More specifically, FIG. 2 is a plan view illustrating a pixel in a liquid crystal display device of the fringe filed switching (FFS) type, which is a variant of the in-plane switching (IPS) scheme. Note however that although the following description is based on the assumption that the invention is applied to an FFS liquid crystal display device, the invention can also be applied to other types of liquid crystal display devices.

As illustrated in FIG. 2, scan lines 10 extend horizontally and are arranged vertically while video signal lines 20 extend vertically and are arranged horizontally. A pixel electrode 111 is formed in the area surrounded by two scan lines 10 and two video signal lines 20. The pixel electrode 111 has slits 1111 formed thereon. Although FIG. 2 illustrates the pixel electrode 111 as having two slits 1111 and three bars, it can instead be an electrode with one slit 1111 and two bars or a bar-shaped electrode without slits when the pixel is small enough.

In FIG. 2, a U-shaped semiconductor layer 103 connected to a video signal line 20 via a drain through-hole 140 extends passing under a scan line 10 twice. The two portions where the semiconductor layer 103 passes under the scan line 10 serve as TFTs or switching elements. In other words, at those portions, the scan line 10 serves as a gate electrode. The semiconductor layer 103 is connected to a contact electrode 107 at a source through-hole 120, and the contact electrode 107 is connected to the pixel electrode 111 at a through-hole 130. In response to a gate signal from the scan line 10, the TFTs open and apply to the pixel electrode 111 a video signal transmitted from the video signal line 20.

The through-hole 130 is formed in an organic passivation film 108 and has a trapezoidal shape in cross section. Further, a capacitor insulating film 110 that insulates the pixel electrode 111 and a common electrode 109 extends into the through-hole 130, and the pixel electrode 111 and the contact electrode 107 are connected together via an opening 131 formed in the capacitor insulating film 110. In other words, the through-hole 130 is a cone-shaped recessed portion and has the opening 131 of the capacitor insulating film 110 formed at the bottom of the cone-shaped recessed portion.

The pixel electrode 111 and the contact electrode 107 can be connected together directly, but connective indium tin oxide (ITO) 135 is formed between the pixel electrode 111 and the contact electrode 107 to ensure a reliable connection. The connective ITO 135 is formed at the same time as the common electrode 109, but electrically insulated from it. As can be seen from the plan view of FIG. 2, the edge portion of the connective ITO 135 is formed around the opening area, of the through-hole 130, on the insulating film 108 such that the area of the connective ITO 135 is larger than the opening area of the through-hole 130. Although FIG. 2 illustrates the opening area of the through-hole 130 as a rectangle, it can instead be circular. In either case, the edge portion of the connective ITO 135 is formed around the opening area of the through-hole 130.

Because a large recessed portion is formed at the through-hole 130, an alignment film material is repelled by the recessed portion at the time of applying the material, which makes it difficult for the material to enter the through-hole 130. It should be noted that, hereinafter, the alignment film material may be referred to simply as "the alignment film." When the alignment film 112 is repelled by only the through-hole 130, display unevenness is less likely to be noticed. However, if the region where the alignment film 112 is repelled by the through-hole 130 connects to the region where the alignment film 112 is repelled by another through-hole 130, the whole region where the alignment film 112 is not formed becomes large, resulting in display unevenness as illustrated in FIG. 4. Hereinafter, regions where the alignment film 112 is not formed are also called alignment film repelled regions.

Figure 3:
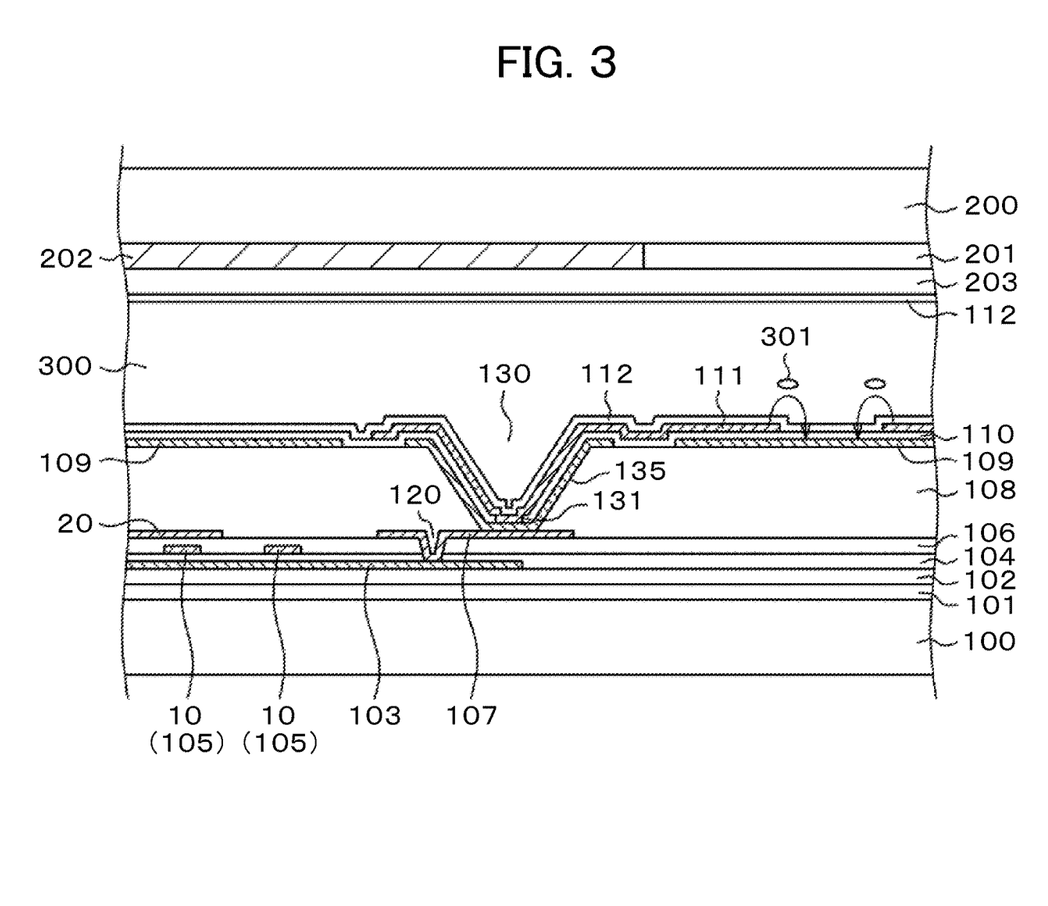
FIG. 3 is a cross section taken along line A-A of FIG. 2.

FIG. 3 is a cross section taken along line A-A of FIG. 2. The TFT of FIG. 3 is a so-called top-gate type TFT, and the semiconductor used therein is low temperature polycrystalline silicon (LTPS). As illustrated in FIG. 3, a first undercoat film 101, made from silicon nitride (SiN), and a second undercoat film 102, made from silicon dioxide ($SiO_2$), are formed on a glass substrate 100 by chemical vapor deposition (CVD). The first undercoat film 101 and the second undercoat film 102 play the role of preventing the semiconductor layer 103 from being contaminated by impurities from the glass substrate 100.

The semiconductor layer 103 is formed on the second undercoat film 102. The semiconductor layer 103 is formed by first depositing an amorphous silicon (a-Si) film on the second undercoat film 102 by CVD and then laser-annealing the film to convert it into a polycrystalline silicon (poly-Si) film. This poly-Si film is subjected to photolithographic patterning.

Formed on the semiconductor layer 103 is a gate insulating film 104, which is an $SiO_2$ film formed from tetraethyl orthosilicate (TEOS). The gate insulating film 104 can also be deposited by CVD. Formed on the gate insulating film 104 are gate electrodes 105. As illustrated in FIG. 2, a scan line 10 acts as the gate electrodes 105. Since the semiconductor layer 103 passes under the scan line 10 twice, it follows that two gate electrodes 105 are formed, as illustrated in FIG. 3. The two gate electrodes 105 are each formed, for example, of a molybdenum-tungsten (MoW) film.

An inter-layer insulating film 106, made of $SiO_2$, is formed to cover the gate electrodes 105. The inter-layer insulating film 106 is used to insulate the gate electrodes 105 from the contact electrode 107 or insulate the scan line 10 from a video signal line 20. Formed in the inter-layer insulating film 106 and the gate insulating film 104 is the source through-hole 120, which connects the semiconductor layer 103 and the contact electrode 107. The photolithography needed to form the source through-hole 120 is simultaneously performed on the inter-layer insulating film 106 and the gate insulating film 104.

A video signal line 20 is formed on the inter-layer insulating film 106. At the drain though-hole 140 shown in FIG. 2, the video signal line 20 is connected to the semiconductor layer 103. It thus follows that as illustrated in FIG. 2, two TFTs are formed between the drain through-hole 140 and the source through-hole 120. The contact electrode 107 and the video signal line 20 are formed at the same level, i.e., on the inter-layer insulating film 106. The contact electrode 107 is connected to the pixel electrode 112 via the through-hole 130 and the opening 131 formed therein. The video signal line 20 and the contact electrode 107 are formed, for example, of an aluminum (Al) alloy, MoW, or a laminate of these materials.

An organic passivation film 108 is formed to cover the video signal line 20 and the contact electrode 107. The organic passivation film 108 is formed of a photosensitive acrylic resin; it can also be formed of a silicone resin, an epoxy resin, a polyimide resin, or the like. The organic passivation film 108 is formed thick because it needs to act also as a planarizing film. The thickness of the organic passivation film 108 is usually in the range of 2 to 4 µm, and it is about 3.5 µm in the present invention.

To establish an electric connection between the pixel electrode 111 and the contact electrode 107, the through-hole 130 is formed in the organic passivation film 108. As stated above, the organic passivation film 108 is formed of a photosensitive resin. After the application of the photosensitive resin, it is exposed to light, thereby causing only the light-exposed portions to melt into a particular developing solution. Thus, the use of the photosensitive resin makes a photoresist unnecessary. After the through-hole 130 has been formed in the organic passivation film 108, the film is baked at about 230 degrees Celsius, which finalizes the formation of the organic passivation film 108.

Thereafter, ITO is sputtered to form the common electrode 109. Patterning is then performed such that the sputtered ITO is removed from the through-hole 130 and its nearby area. The common electrode 109 is formed flat across several pixels.

With the use of the ITO that constitutes the common electrode 109, the connective ITO 135 is formed simultaneously in the through-hole 130. The connective ITO 135 is provided to ensure a reliable connection between the pixel electrode 111 and the contact electrode 107 in the later-formed opening 131 of the capacitor insulating film 110. The connective ITO 135 is insulated from the common electrode 109.

Silicon nitride (SiN) is then deposited over the entire surface by CVD to form the capacitor insulating film 110. To establish an electric connection between the connective ITO 135 and the pixel electrode 111 at the through-hole 130, the opening 131 is then formed in the capacitor insulating film 110. Thereafter, ITO is sputtered and patterned to form the pixel electrode 111. The planar shape of the pixel electrode 111 is illustrated in FIG. 2. The pixel electrode 111 is connected to the contact electrode 107 via the connective ITO 135.

An alignment film material is applied onto the pixel electrode 111 by flexography printing, inkjet printing, or the like. The alignment film material is in the form of liquid at the time of the application, but it may not enter the through-hole 130 due to surface tension. As will be described later in detail, a main feature of the invention lies in the special shape of the area around the through-hole 130 that allows the alignment film material to enter the through-hole 130 easily.

After the application of the alignment film material, it is baked to form the alignment film 112. To perform alignment treatment on the alignment film 112, either the rubbing treatment or the photo-alignment treatment with the use of ultraviolet light can be used. Voltage application between the pixel electrode 111 and the common electrode 109 results in such electric force lines as those shown in FIG. 3. This electric field causes liquid crystal molecules 301 to rotate, thereby controlling the amount of light passing through a liquid crystal layer 300 on a pixel-by-pixel basis to produce an image.

As illustrated in FIG. 3, the counter substrate 200 is located across from the TFT substrate 100 with the liquid crystal layer 300 inserted therebetween. Formed underneath the counter substrate 200 is a color filter array 201. The color filter array 201 includes red, green, and blue color filters for pixels, with which a color image can be formed. A black matrix 202 is formed so as to cover the through-hole 130 formed in the TFT substrate and TFTs, thereby enhancing image contrast.

Formed underneath the color filter array 201 and the black matrix 202 is an overcoat film 203. The overcoat film 203 prevents components of the color filter array 201 from diffusing into the liquid crystal layer. Underneath the overcoat film 203 is another alignment film 112 to determine the initial alignment of the liquid crystals. To perform alignment treatment on this alignment film 112, either the rubbing method or the photo-alignment method can be used, as is similar to the alignment film 112 on the side of the TFT substrate 100.

FIG. 4 illustrates an example of display unevenness that results from light leakage due to the absence of the alignment film. Such display unevenness is attributed to the occurrence of regions where the alignment film does not enter the through-hole 130. The through-hole 130 is covered by the black matrix formed on the counter substrate, but it cannot block light completely. Also, when multiple regions where the alignment film is not formed are connected to one another across several pixels, the problem of light leakage becomes more serious.

Figure 5A:
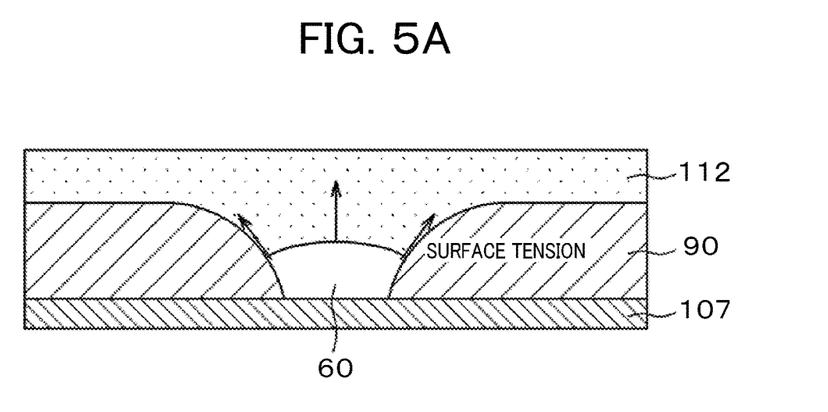
FIG. 5A is a schematic cross section illustrating the application of an alignment film material when the invention is not applied.
Figure 5B:
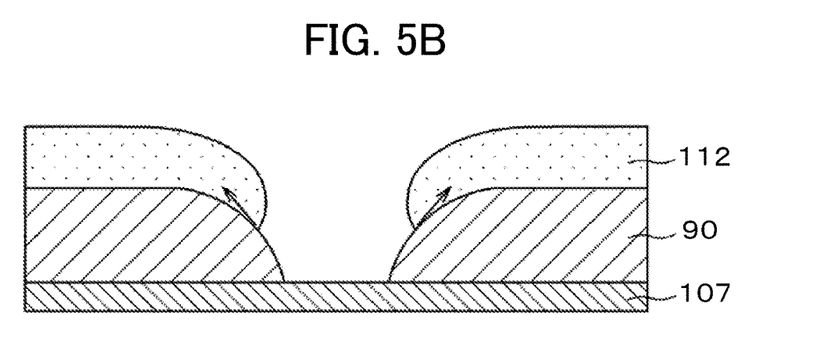
FIG. 5B is another schematic cross section illustrating the application of the alignment film material when the invention is not applied.
Figure 5C:
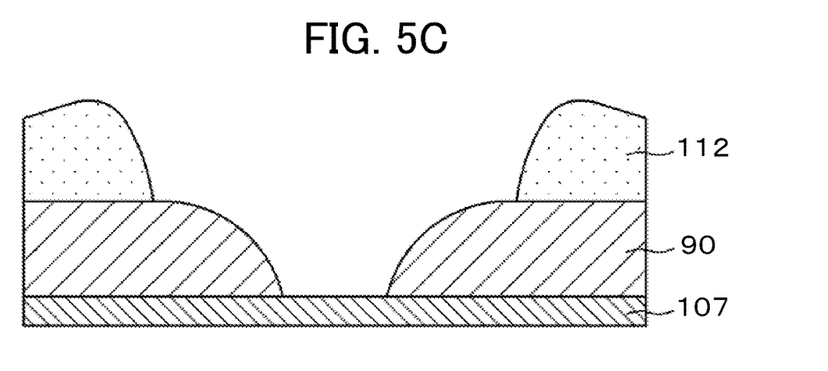
FIG. 5C is still another schematic cross section illustrating the application of the alignment film material when the invention is not applied.

FIGS. 5A to 5C are schematic cross sections illustrating the reason the alignment film is not formed in the through-hole 130. In FIGS. 5A to 5C, only the contact electrode 107, a laminated film 90, and the alignment film material 112 are illustrated. The laminated film 90 refers to a collection of the organic passivation film 108, the connective ITO 135, the capacitor insulating film 110, the pixel electrode 111, and so forth. Note that the edge portion of the cross sectional shape of the through-hole 130 is rounded so as to represent the actual shape of the through-hole 130.

FIG. 5A represent the state where the alignment film material 112, which is in the form of liquid, is applied onto the laminated film 90 after the formation of the through-hole 130. As illustrated in FIG. 5A, an air bubble 60 is trapped at the bottom of the through-hole 130. This air bubble 60 moves upward as denoted by the arrows.

FIG. 5B illustrates the tendency of the alignment film material 112 to move toward the nearby area of the through-hole 130, that is, toward a stable position, when separated by the air bubble 60. The arrows represent the moving directions of the alignment film material 112. FIG. 5C is a cross section illustrating the region where the alignment film material 112 exists stably. As illustrated in FIG. 5C, the alignment film material 112 exists stably at the bank located around the through-hole 130, and it is not present in the through-hole 130. This results in display unevenness.

Figure 6A:
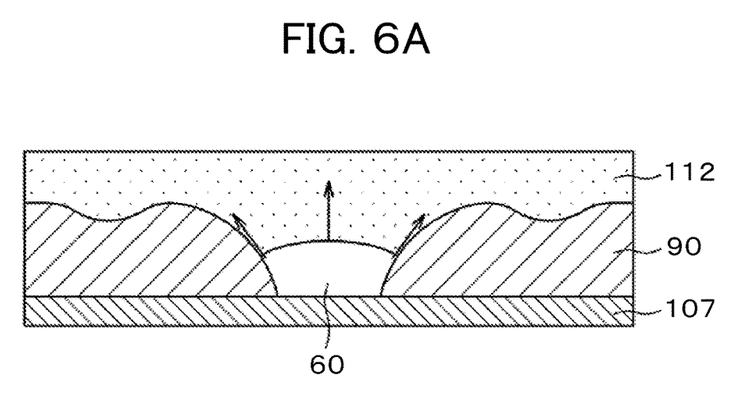
FIG. 6A is a schematic cross section illustrating the application of an alignment film material when the invention is applied.
Figure 6B:
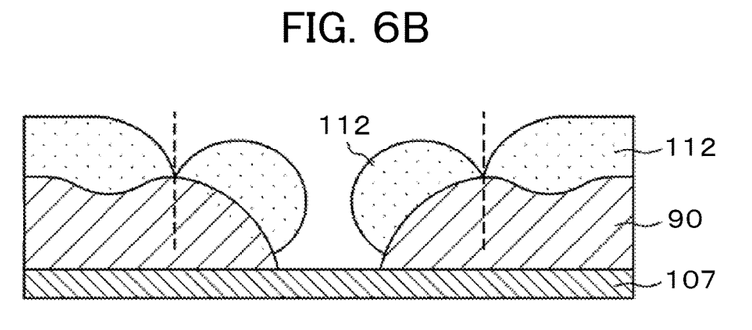
FIG. 6B is another schematic cross section illustrating the application of the alignment film material when the invention is applied.
Figure 6C:
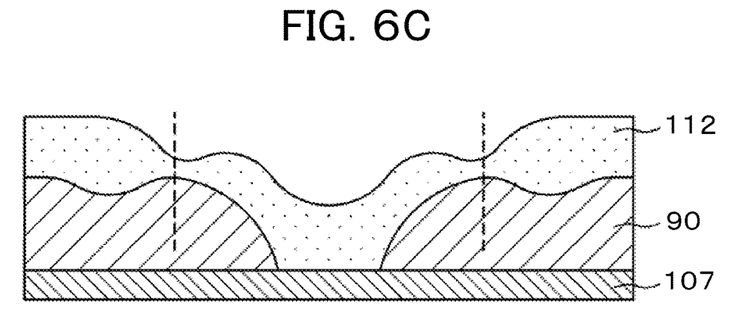
FIG. 6C is still another schematic cross section illustrating the application of the alignment film material when the invention is applied.

FIGS. 6A to 6C are schematic cross sections illustrating a structure according to the invention that prevents such a phenomenon. In FIGS. 6A to 6C, only the contact electrode 107, the laminated film 90, and the alignment film material 112 are illustrated. The laminated film 90 refers to a collection of the organic passivation film 108, the connective ITO 135, the capacitor insulating film 110, the pixel electrode 111, and so forth. Note that the edge portion of the cross sectional shape of the through-hole 130 is rounded so as to represent the actual shape of the through-hole 130. FIGS. 6A to 6C differs from FIGS. 5A to 5C in that, in the former figures, projecting and recessed portions are formed on the laminated film 90 such that they surround the through-hole 130. Those projecting and recessed portions are formed in a radial direction with respect to the center of the through-hole 130.

As illustrated in FIG. 6A, the alignment film material 112 is applied on the through-hole 130 and the laminated film 90 on which the projecting and recessed portions are formed. Similar to FIG. 5A, the air bubble 60 exists at the bottom of the through-hole 130 and has the tendency to move upward.

FIG. 6B illustrates the state where the air bubble 60 is released from the through-hole 130. As illustrated in FIG. 6B, a projecting portion is formed in the area of the laminated film 90 that is located around the through-hole 130. Due to the presence of the projecting portion, the bank around the through-hole 130 is no longer a stable position for the alignment film material 112. As a result, the alignment film material 112 gets separated at the projecting portion and moves toward the through-hole 130 or toward the recessed portion.

The alignment film material 112 that has moved toward the through-hole 130 flows toward the bottom of the through-hole 130, whereby the through-hole 130 is filled with the alignment film material 112. This is illustrated in FIG. 6C. As described above, the alignment film material 112 can be easily formed in the through-hole 130 by forming the projecting and recessed portions on the laminated film 90 in a radial direction of the through-hole 130 such that they surround the through-hole 130.

Figure 7:
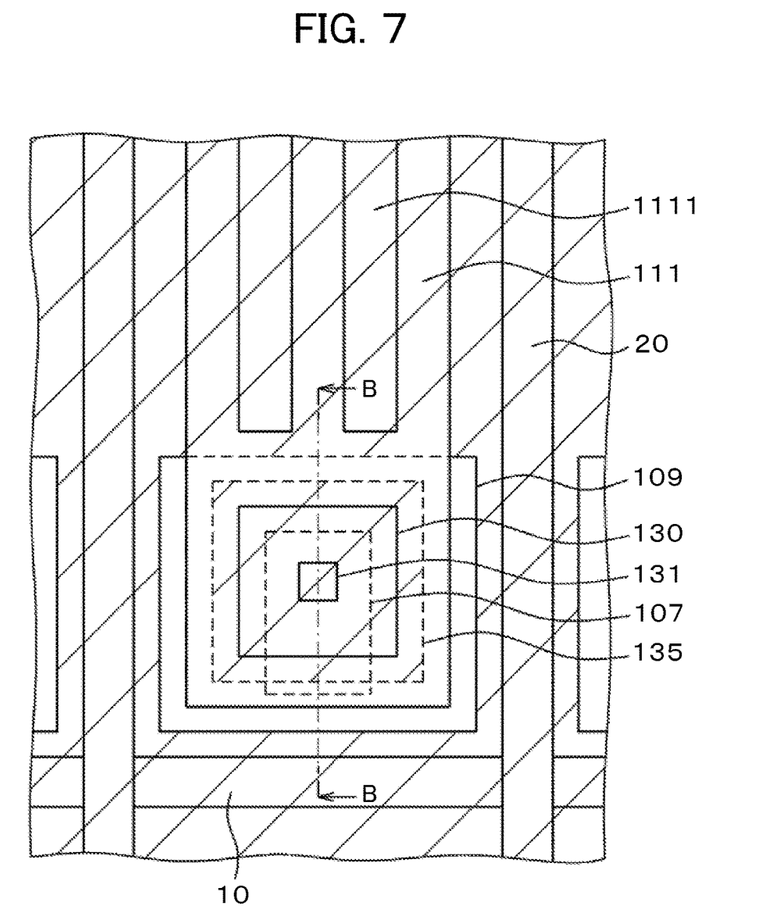
FIG. 7 is a plan view illustrating Embodiment 1 of the invention.

FIG. 7 is a plan view of the through-hole 130 and its nearby area. FIG. 7 is the same as FIG. 2, but for simplification purposes, the semiconductor layer 103, the drain through-hole 140, and the source through-hole 120 are not illustrated. We omit the explanation of the other layer components since it has already been made with reference to FIG. 2.

Figure 8:
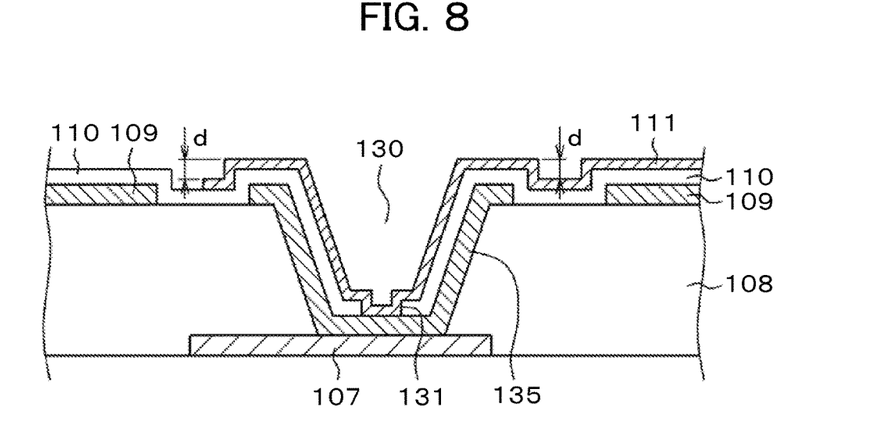
FIG. 8 is a cross section taken along line B-B of FIG. 7.

FIG. 8 is a cross section taken along line B-B of FIG. 7 that illustrates Embodiment 1. In FIG. 8, those layers located below the contact electrode 107 are not illustrated, and neither is the alignment film. The reason is that an important feature of the invention is the cross sectional shape of the nearby area of the through-hole 130 before the formation of the alignment film 112. The layer structure of FIG. 8 is substantially the same as that of FIG. 3.

FIG. 8 differs from FIG. 3 in that, in the former, the thickness of the ITO that constitutes the common electrode 109 is increased. In addition to increasing the thickness of the common electrode 109, the thickness of the connective ITO 135 is also increased. By doing so, a recessed portion including inner and outer steps d is formed around the through-hole 130, that is, in a radial direction with respect to the center of the through-hole 130, as illustrated in FIG. 8. In this case as well, as described with reference to FIGS. 6A to 6C, it is possible to prevent the formation of the air bubble 60 in the through-hole 130 at the time of applying the alignment film material 112, whereby the through-hole 130 can be filled with the alignment film material 112.

In FIG. 8, since the thicknesses of the common electrode 109 and the connective ITO 135 are both increased, the inner and outer steps of the depth d are formed in a radial direction of the through-hole 130, which constitute the recessed portion. The thickness of the common electrode 109 is typically about 50 nm, but the thickness of the common electrode 109 of Embodiment 1 is, for example, 150 nm. Thus, the recessed portion can have a depth of 150 nm or thereabout. By applying the same method to the structure of FIG. 3, the depth of the recessed portion of FIG. 3 can also be increased by about 100 nm.

Embodiment 2

Figure 9:
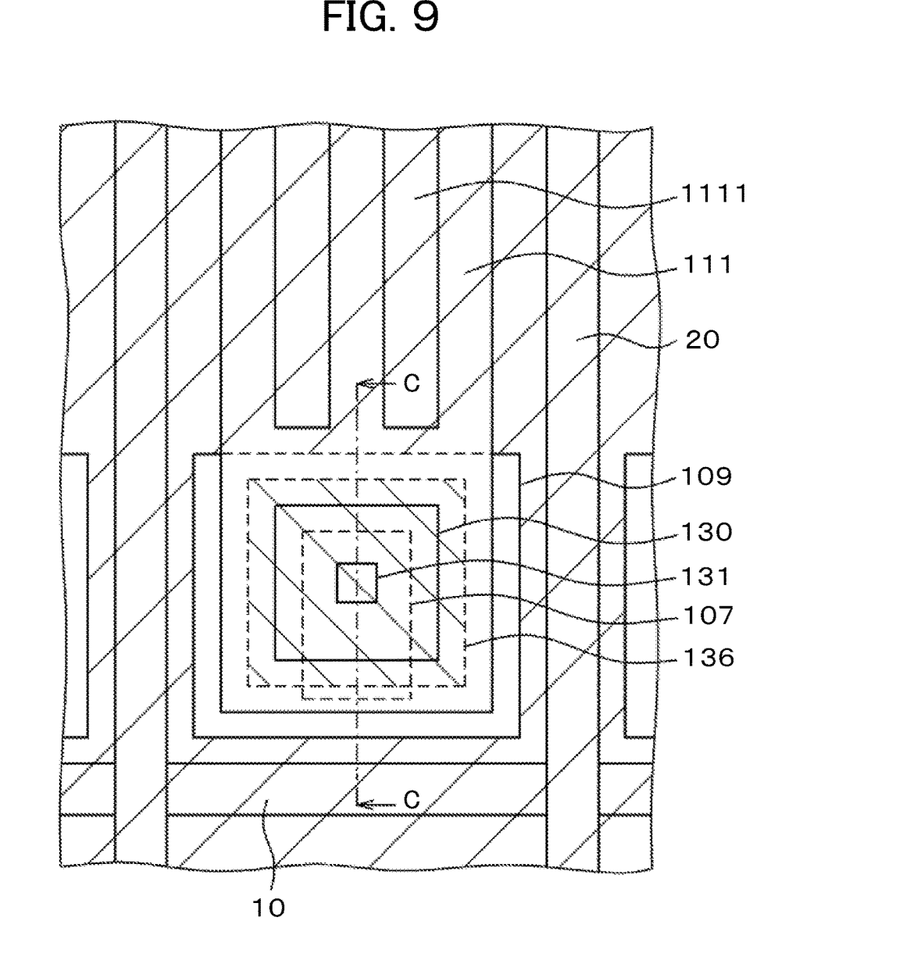
FIG. 9 is a plan view illustrating Embodiment 2 of the invention.

FIG. 9 is a plan view of the nearby area of the through-hole 130 according to Embodiment 2 of the invention. In terms of shape, FIG. 9 is the same as FIG. 7 that illustrates Embodiment 1. However, FIG. 9 differs from FIG. 7 in that, in the former, the connective electrode formed in the through-hole 130 is not formed of ITO but metal. This metal is hereinafter referred to as the connective metal 136. Since the common electrode 109 is formed across the entire screen except through-holes 130 and their nearby areas, increasing the thickness of the common electrode 109 will decrease the light transmittance, which may constitute a disadvantage in terms of screen brightness.

Therefore, it is desired that the common electrode 109 be formed thin. However, reducing the thickness of the common electrode 109 will, in turn, increase its electrical resistance when it is formed of ITO. To avoid this, metal wires are often formed on the common electrode 109. Such metal wires can be formed so as to overlap scan lines 10 or video signal lines 20 as viewed in plan view, whereby the transmittance can be prevented from decreasing.

Those metal wires can be structurally the same as the video signal lines 20, which have, for example, a three-layered structure in which Al alloy is sandwiched between two molybdenum (Mo) or Mo alloy layers. Alternatively, in the metal wire structure, Mo alloy can be formed on only one side of the Al alloy. In place of the Mo alloy, tungsten (W) alloy or titanium (Ti) can also be used.

Because such metal wires are arranged so as not to affect the transmittance, they can be formed thick, for example, to have a thickness of 150 nm or thereabout. In FIG. 9, in addition to forming these metal wires, the connective metal 136 is formed in the through-hole 130. Since the connective metal 136 can be formed thick, for example, to have a thickness of 150 nm or thereabout, projecting and recessed portions can be formed around the through-hole 130, that is, in a radial direction with respect to the center of the through-hole 130.

Figure 10:
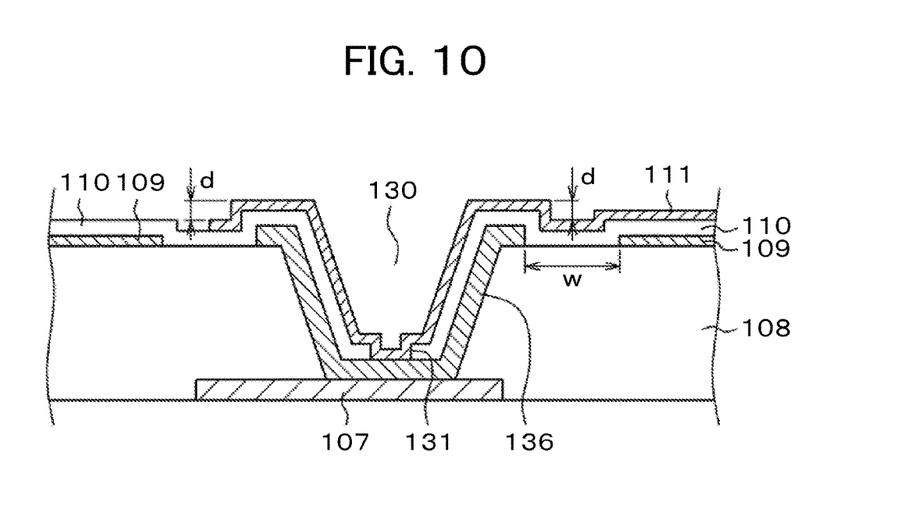
FIG. 10 is a cross section taken along line C-C of FIG. 9.

FIG. 10 is a cross section taken along line C-C of FIG. 9. FIG. 10 differs from FIG. 8 that illustrates Embodiment 1 in that, in the former, the connective metal 136 is formed thicker while the common electrode 109 remains thin. This allows formation of a recessed portion, which has, for example, the depth d, around the through-hole 130, that is, in a radial direction with respect to the center of the through-hole 130.

An advantage of Embodiment 2 is that the transmittance can be prevented from decreasing since the common electrode 109 does not need to be formed thick. Since the through-hole 130 is covered with the black matrix, increasing the thickness of the connective metal 136 formed in the through-hole 130 does not affect the transmittance.

Another advantage of Embodiment 2 is that the distance w between the common electrode 109 and the connective metal 136 can be made smaller than the counterpart of Embodiment 1. In Embodiment 1, since the connective ITO 135 and the common electrode 109 are formed simultaneously, the distance w between them is determined by light exposure conditions. By contrast, in Embodiment 2, the common electrode 109 and the connective metal 136 are formed in different photolithographic steps. Thus, the distance w between the common electrode 109 and the connective metal 136 is determined by alignment accuracy. Because light exposure conditions generally place more limitations than alignment accuracy, the distance w of FIG. 10 can be made smaller in Embodiment 2 than in Embodiment 1. Therefore, the area covered with the black matrix can be made smaller, which in turn increases the transmittance.

As stated above, Embodiment 2 makes it possible to easily form the alignment film 112 in the through-hole 130 while preventing the transmittance from decreasing. In other words, it makes it possible to prevent display unevenness while preventing the brightness from decreasing.

Embodiment 3

Figure 11:
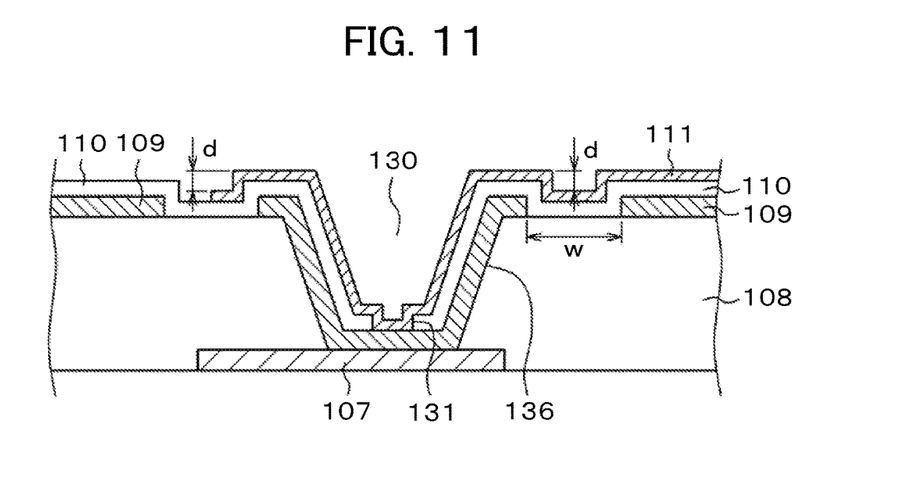
FIG. 11 is a cross section illustrating Embodiment 3 of the invention.

FIG. 11 is a cross section of the nearby area of the through-hole 130 according to Embodiment 3. A plan view of FIG. 11 is the same as that of FIG. 9. As illustrated in FIG. 11, the connective metal 136 is formed in and around the through-hole 130. The thickness of the connective metal 136 is, for example, about 150 nm, as is similar to Embodiment 2.

FIG. 11 differs from FIG. 10 in that, in the former, the thickness of the common electrode 109 is also increased as in Embodiment 1. Thus, the resultant recessed portion is allowed to have inner and outer steps of substantially the same height in a radial direction with respect to the center of the through-hole 130.

FIG. 11 also differs from FIG. 8 that illustrates Embodiment 1 in that, in the former, the distance w between the connective metal 136 and the common electrode 109 can be made smaller than the counterpart of Embodiment 1. The reason is the same as in Embodiment 2. Thus, the width of the black matrix can be made smaller than in Embodiment 1, and the transmittance can be increased accordingly.

As described above, Embodiment 3 also facilitates the formation of the alignment film 112 in the through-hole 130 and prevents display unevenness that results from the presence of regions where the through-hole 130 is not filled with the alignment film material 112.

Embodiment 4

Figure 12:
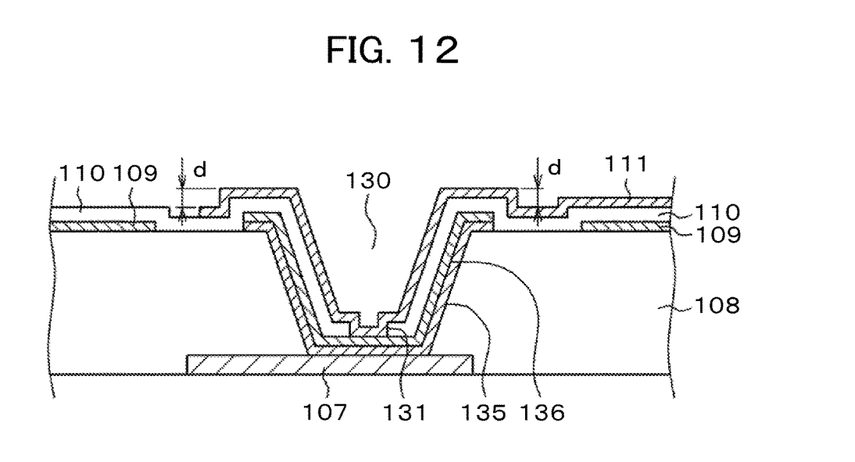
FIG. 12 is a cross section illustrating Embodiment 4 of the invention.

FIG. 12 is a cross section of the nearby area of the through-hole 130 according to Embodiment 4. A plan view of FIG. 12 is the same as that of FIG. 9. As illustrated in FIG. 12, a laminate structure including the connective ITO 135 and the connective metal 136 is formed in and around the through-hole 130. The thickness of the connective metal 136 is, for example, about 100 nm while the thickness of the connective ITO 135 is about 50 nm. The thickness of the common electrode 109 is also 50 nm.

A feature of FIG. 12 is that since the laminate structure of the connective ITO 135 and the connective metal 136 is used in the through-hole 130, the step d of FIG. 12 can be easily formed larger. Since the common electrode 109 does not need to be made thicker than is necessary, the transmittance can be prevented from decreasing. Although the connective metal 136 of FIG. 12 has a thickness of 100 nm, it can instead be about 150 nm thick, in which case the step d has a height of 200 nm. As the step d becomes larger, the advantageous effect of Embodiment 4 will become more obvious. As described above, Embodiment 4 facilitates the formation of the alignment film 112 in the through-hole 130 in a more effective manner while preventing the transmittance from decreasing.

In Embodiment 4, the connective metal 136 is formed only in the through-hole 130. However, the transmittance will not be affected if the connective metal 136 is used anywhere in the area covered with the black matrix. For instance, in FIG. 12, the same metal as the connective metal 136 can be formed on the common electrode 109 in the area covered with the black matrix. By doing so, the radially outer step of the recessed portion with respect to the center of the through-hole 130 can also be made larger.

The structures of Embodiments 1 through 4 of the invention are characterized in that, by forming the connective ITO 135 or the connective metal 136 in and around the through-hole 130, a recessed portion having steps d is formed in a radial direction with respect to the center of the through-hole 130. When these steps d have a height of 100 nm or more, a greater effect can be obtained.

FIGS. 8, 10, 11, and 12 are cross sections of the through-hole 130 when viewed from the extending direction of a video signal line 20. It should be noted however that a cross section of the through-hole 130 when viewed from a direction perpendicular to the video signal line 20 is also the same. In the present invention, since steps are formed around the through-hole 130, the alignment film 112 can be formed effectively in the through-hole 130.

It should further be noted that the pixel electrode 111 becomes smaller as the size of the pixel becomes smaller, in which case the capacitance formed via the capacitor insulating film 110 between the pixel electrode 111 and the common electrode 109 becomes insufficient. On the other hand, the capacitance can be increased by making the capacitor insulating film 110 thinner. For instance, if the thickness of the capacitor insulating film 110 is reduced from 140 to 70 nm, the capacitance will be increased twofold.

The problem associated with the reduced thickness of the capacitor insulating film 110 is that the organic passivation film 108 is not fully covered with the capacitor insulating film 110 in the through-hole 130 where a large recessed portion is formed. Because the organic passivation film 108 contains moisture, the moisture will move into the liquid crystal layer 300, reduce the resistance of the liquid crystals, and produce black spots on the screen if the organic passivation film 108 is not covered with the capacitor insulating film 110.

In the present invention, by contrast, the organic passivation film 108 is covered not only with the capacitor insulating film 110 but also with the connective ITO 135 or the connective metal 136 in the through-hole 130. Thus, the moisture is prevented from moving from the organic passivation film 108 into the liquid crystal layer 300. Therefore, the invention ensures a sufficient capacitance by reducing the thickness of the capacitor insulating film 110 even in the case of smaller pixels.

What is claimed is:

1. A liquid crystal display device comprising:
  a first substrate having a plurality of scan lines, a plurality of video signal lines, and pixels formed in areas surrounded by the plurality of scan lines and the plurality of video signal lines;
  a second substrate; and
  a liquid crystal layer sandwiched between the first substrate and the second substrate, wherein:
  each of the pixels includes a switching element, a pixel electrode, a common electrode, and a through-hole formed in an insulating film located between the switching element and the pixel electrode;
  a connection conductive layer is formed on an inner wall portion of the through-hole and in a through-hole surrounding area of the insulating film so as to electrically connect the pixel electrode and the switching element;
  wherein the connection conductive layer formed in the through-hole surrounding area of the insulating film is formed around an opening area of the through-hole when viewed in a plan view,
  the opening area of the through-hole has a first circumference,
  the connection conductive area has a second circumference,
  a width between the first circumference and the second circumference is substantially uniform around the opening area of the through-hole, and
  a step is formed outside of an edge portion of the connection conductive layer in the through-hole surrounding area of the insulating film, the step being covered with an alignment film.

2. The liquid crystal display device of claim 1, wherein the connection conductive layer is formed of indium tin oxide (ITO).

3. The liquid crystal display device of claim 2, wherein the connection conductive layer is formed at the same time as the common electrode is formed.

4. The liquid crystal display device of claim 2, wherein the connection conductive layer has a thickness of 100 nm or more.

5. The liquid crystal display device of claim 1, wherein the connection conductive layer is formed of metal layer.

6. The liquid crystal display device of claim 5, wherein the connection conductive layer has a thickness of 100 nm or more.

7. The liquid crystal display device of claim 1, wherein the connection conductive layer is formed of a laminate of indium tin oxide (ITO) and a metal layer.

8. The liquid crystal display device of claim 7, wherein the step has a height of 100 nm or more.

9. The liquid crystal display device of claim 1, wherein:
  the insulating film between the switching element and the pixel electrode is an organic passivation film;
  a capacitor insulating film is formed on a liquid crystal layer side of the connection conductive layer to insulate the common electrode and the pixel electrode; and
  the step is formed on the capacitor insulating film.

* * * * *